United States Patent
Stout et al.

(10) Patent No.: US 10,117,316 B1
(45) Date of Patent: Oct. 30, 2018

(54) ROTATING IDENTIFICATIONS IN LIGHT-BASED POSITIONING SYSTEMS

(71) Applicants: Barry Stout, Beverly, MA (US); Reiner Windisch, Pettendorf (DE); Nitin Kumar, Munich (DE); Claus Diener, Wolnzach (DE); Klaus Ziemssen, Starnberg (DE)

(72) Inventors: Barry Stout, Beverly, MA (US); Reiner Windisch, Pettendorf (DE); Nitin Kumar, Munich (DE); Claus Diener, Wolnzach (DE); Klaus Ziemssen, Starnberg (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/783,237

(22) Filed: Oct. 13, 2017

(51) Int. Cl.
H04B 10/00 (2013.01)
H05B 37/02 (2006.01)
H04B 10/116 (2013.01)

(52) U.S. Cl.
CPC ....... *H05B 37/0272* (2013.01); *H04B 10/116* (2013.01); *H05B 37/0218* (2013.01); *H05B 37/0227* (2013.01)

(58) Field of Classification Search
USPC ....................................................... 398/172
See application file for complete search history.

(56) References Cited

U.S. PATENT DOCUMENTS

| | | | | |
|---|---|---|---|---|
| 3,697,941 A * | 10/1972 | Christ | ...................... | G08G 1/20 340/991 |
| 5,648,862 A * | 7/1997 | Owen | ..................... | H04B 10/11 342/45 |
| 7,006,768 B1 * | 2/2006 | Franklin | ............ | H04B 10/1149 398/115 |
| 7,352,972 B2 * | 4/2008 | Franklin | ............ | H04B 10/1141 398/127 |
| 8,593,299 B2 * | 11/2013 | Pederson | ........... | H04B 10/1143 340/815.45 |
| 8,660,436 B2 * | 2/2014 | Schenk | .............. | H05B 37/0272 315/294 |
| 8,737,842 B2 * | 5/2014 | Schenk | .............. | H05B 33/0863 398/107 |
| 2006/0275040 A1 * | 12/2006 | Franklin | ............ | H04B 10/1141 398/172 |
| 2015/0372753 A1 * | 12/2015 | Jovicic | ................. | H04B 10/116 398/172 |

(Continued)

*Primary Examiner* — Agustin Bello
(74) *Attorney, Agent, or Firm* — Yutian Ling

(57) ABSTRACT

Various embodiments disclosed herein include a light-based communication system. The system includes a plurality of luminaires, in which each of the plurality of luminaires is configured to transmit light-based communication (LCom) signals, and a server communicatively coupled to the plurality of luminaires. The server is configured to assign an identifier to each of the plurality of luminaires, transmit the assigned identifier to each of the plurality of luminaires, in which each of the plurality of luminaires transmits the assigned identifier via LCom signals, rotate, in response to receiving a trigger signal, the assigned identifier for each of the plurality of luminaires, and transmit the rotated identifier to each of the plurality of luminaires, in which each of the plurality of luminaires transmits the rotated identifier via LCom signals.

29 Claims, 9 Drawing Sheets

(56) References Cited

U.S. PATENT DOCUMENTS

2016/0191159 A1\* 6/2016 Aoyama .............. H04B 10/116
398/172
2016/0197675 A1\* 7/2016 Ganick ................ H04N 5/2256
398/172

\* cited by examiner

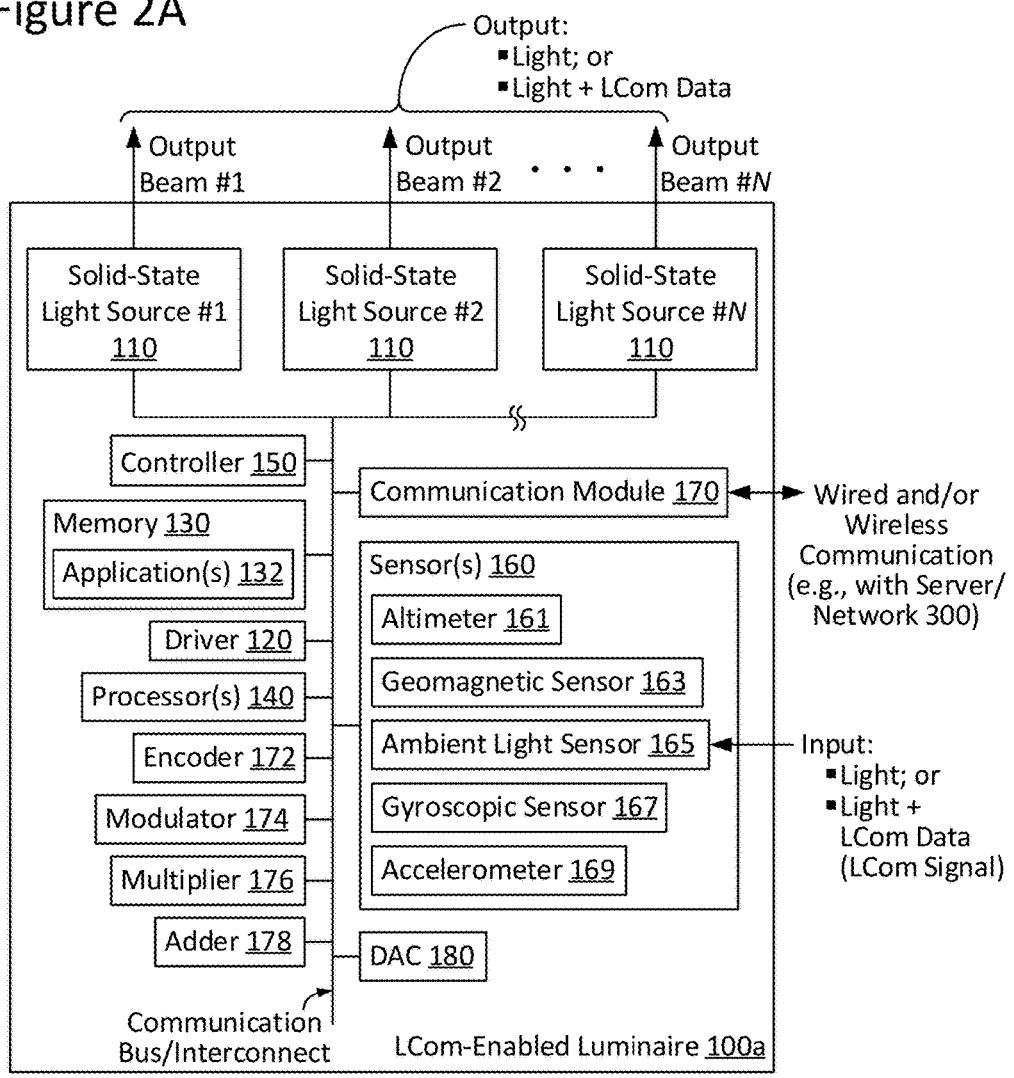

ROTATING IDENTIFICATIONS IN LIGHT-BASED POSITIONING SYSTEMS

FIELD OF THE DISCLOSURE

This disclosure relates to light-based communication (LCom), and more specifically to assigning and rotating identifiers to luminaires that communicate via LCom signals.

BACKGROUND

Indoor navigation systems commonly use physical signs and/or radio-frequency (RF) signals to facilitate navigation of buildings or structures. Physical signs may be located throughout a building, such that users can observe each sign along a path to a desired location within the building. RF based navigation systems involve communication signals, such as Wi-Fi signals, for exchanging navigation information with one or more users of the system. These systems often include several RF transmitters (e.g., a BLUETOOTH® Beacon) configured to communicate with users located in or about a building. To ensure sufficient access to the system, these transmitters may be positioned throughout the building.

SUMMARY

Various implementations disclosed herein include a light-based communication system. The system includes a plurality of luminaires, in which each of the plurality of luminaires is configured to transmit light-based communication (LCom) signals, and a server communicatively coupled to the plurality of luminaires. The server is configured to assign an identifier to each of the plurality of luminaires, transmit the assigned identifier to each of the plurality of luminaires, in which each of the plurality of luminaires transmits the assigned identifier via LCom signals, rotate, in response to receiving a trigger signal, the assigned identifier for each of the plurality of luminaires, and transmit the rotated identifier to each of the plurality of luminaires, in which each of the plurality of luminaires transmits the rotated identifier via LCom signals.

In some embodiments, the server is further configured to update mapping information that associates the physical location of each of the plurality of luminaires with the assigned identifier of the luminaire. In some embodiments, the mapping information is stored on a cloud server communicatively coupled to the server. In some embodiments, a computing device receives the LCom signals and accesses the mapping information to determine the position of the computing device. In some embodiments, the server associates a database of identifiers with each of the plurality of luminaires and the assigned identifier and the rotated identifier for each luminaire is selected from the database of identifiers associated with the luminaire. In some embodiments, the server is configured to rotate the assigned identifier for each of the plurality of luminaires by generating, for each of the plurality of luminaires, a subset of identifiers from a database of identifiers, and selecting the rotated identifier from the subset of identifiers. In some embodiments, the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

Further implementations disclosed herein include a method of providing identifiers in a light-based communication system. The method includes assigning, by a server, an identifier to each of a plurality of luminaires, transmitting the assigned identifier to each of the plurality of luminaires, in which each of the plurality of luminaires transmits the assigned identifier via light-based communication (LCom) signals, rotating, by the server in response to receiving a trigger signal, the assigned identifier for each of the plurality of luminaires, and transmitting the rotated identifier to each of the plurality of luminaires, in which each of the plurality of luminaires transmits the rotated identifier via LCom signals.

In some embodiments, the method further includes updating mapping information that associates the physical location of each of the plurality of luminaires with the assigned identifier of the luminaire. In some embodiments, the mapping information is stored on a cloud server communicatively coupled to the server. In some embodiments, a computing device receives the LCom signals and accesses the mapping information to determine the position of the computing device. In some embodiments, the method further includes associating, by the server, a database of identifiers with each of the plurality of luminaires, in which the assigned identifier and the rotated identifier for each luminaire is selected from the database of identifiers associated with the luminaire. In some embodiments, rotating the assigned identifier for each of the plurality of luminaires includes generating, for each of the plurality of luminaires, a subset of identifiers from a database of identifiers, and selecting the rotated identifier from the subset of identifiers. In some embodiments, the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

Further implementations disclosed herein include a light-based communication system that includes a plurality of luminaires. A first luminaire in the plurality of luminaires stores a first database of identifiers and is configured to transmit a first identifier in the first database of identifiers via a first light-based communication (LCom) signal, rotate, in response to receiving a first trigger signal, from the first identifier to a second identifier in the first database of identifiers, and transmit the second identifier via a second LCom signal.

In some embodiments, a second luminaire in the plurality of luminaires stores a second database of identifiers and is configured to transmit a third identifier in the second database of identifiers via a third LCom signal, rotate, in response to receiving a second trigger signal, from the third identifier to a fourth identifier in the second database of identifiers, and transmit the fourth identifier via a fourth LCom signal. In some embodiments, the first database of identifiers and the second database of identifiers includes at least one common identifier. In some embodiments, the first trigger signal and the second trigger signal are received at the same time. In some embodiments, rotating from the first identifier to the second identifier includes generating a subset of identifiers from the first database of identifiers, the subset of identifiers including the second identifier, and selecting the second identifier from the subset of identifiers.

In some embodiments, the subset of identifiers includes the first identifier. In some embodiments, each of the plurality of luminaires is configured to rotate identifiers in response to receiving the first trigger signal. In some embodiments, the first trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires. In some embodiments, a mobile computing device receives the first LCom signal and the second LCom signal and accesses mapping information to determine the position of the computing device.

Additional implementations disclosed herein include a method of providing identifiers in a light-based communication system. The method includes transmitting, by a first luminaire in a plurality of luminaires, a first identifier in a database of identifiers via a first light-based communication (LCom) signal, in which the database of identifiers is stored in the first luminaire, rotating, by the first luminaire in response to receiving a trigger signal, from the first identifier to a second identifier in the database of identifiers, and transmitting, by the first luminaire, the second identifier via a second LCom signal.

In some embodiments, rotating from the first identifier to the second identifier includes generating a subset of identifiers from the database of identifiers, the subset of identifiers including the second identifier, and selecting the second identifier from the subset of identifiers. In some embodiments, the subset of identifiers includes the first identifier. In some embodiments, each of the plurality of luminaires is configured to rotate identifiers in response to receiving the trigger signal. In some embodiments, the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires. In some embodiments, a mobile computing device receives the first LCom signal and the second LCom signal and accesses mapping information to determine the position of the computing device.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 2A is a block diagram illustrating an LCom-enabled luminaire configured in accordance with an embodiment of the present disclosure.

Figure 1:
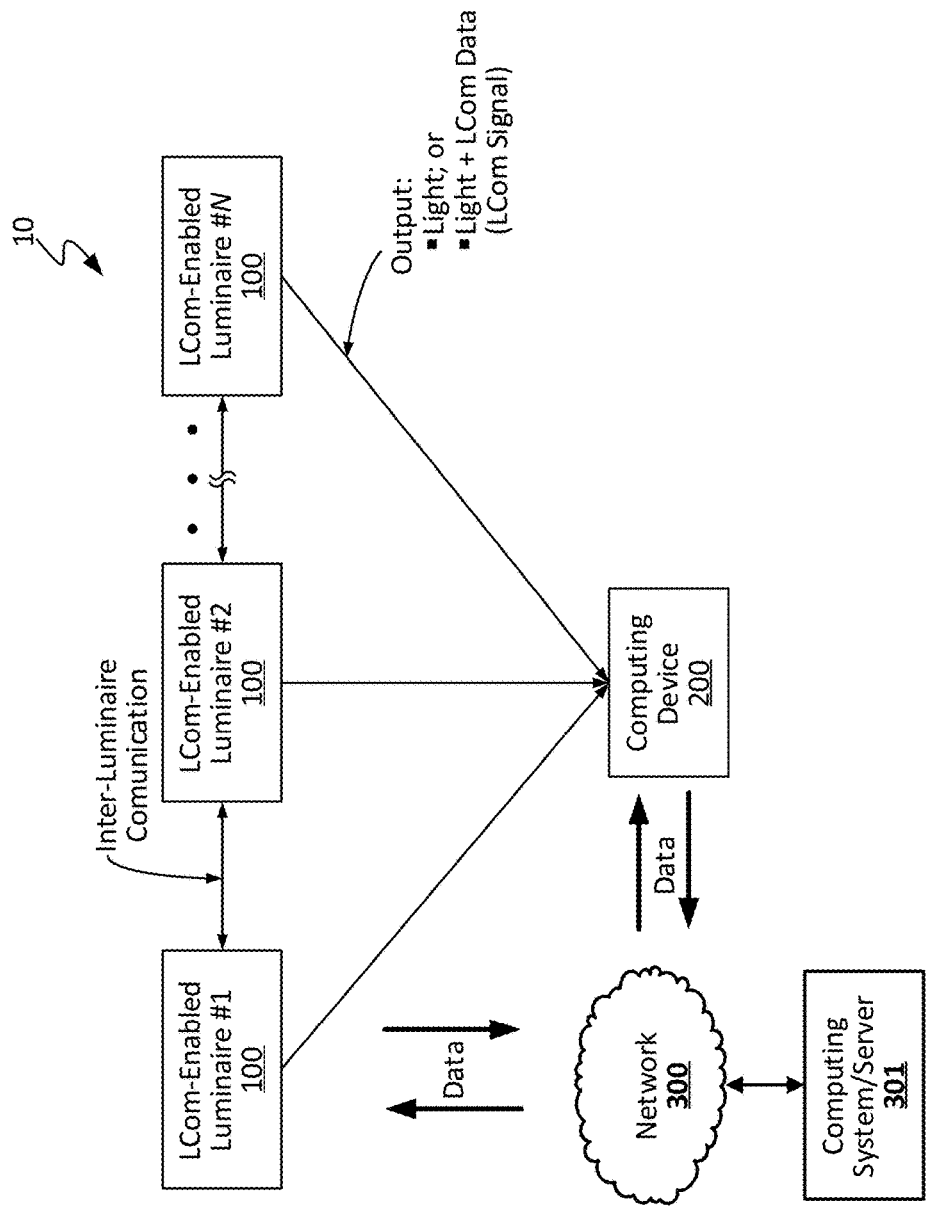
FIG. 1 is a block diagram illustrating an example LCom system configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for assigning and rotating identifiers for luminaires in a LCom system, such as an indoor navigation system. Such a system may thwart attempts to map an indoor space by unauthorized applications or devices. Each luminaire in the LCom system may be capable of transmitting LCom signals encoded with information, such as an identifier of the luminaire. A computing device, such as a smart phone, that receives the LCom signals may be able to determine its own location based on the identifier and other information, such as mapping information that associates luminaire identifiers with physical luminaire locations). In some embodiments, a remote server or another type of central controller may be communicatively coupled to the luminaires and rotate the identifiers transmitted by each luminaire. In other embodiments, each luminaire may store a number of identifiers and rotate through the identifiers. The rotation may be triggered in a number of different ways, such as periodic time intervals, periodic power supply cycles, or changes in power or dimming levels. Numerous lighting applications and embodiments will be apparent in light of this disclosure.

General Overview

Light-based communication ("LCom") systems for indoor navigation provide enhanced precision and accuracy over other technologies, such as GPS or Wi-Fi. LCom systems include luminaires configured to transmit light encoded with information, such as an identifier associated with each luminaire. A computing device (e.g., a smart phone) may receive the LCom signal via sensors (such as a camera or ambient light sensor) and decode the information. A navigation application executing on the computing device may store and/or retrieve mapping information linking luminaire identifiers to physical locations. Based on this information, the navigation application may determine the location of the computing device within the indoor environment.

However, there may be security risks in LCom-based navigation systems. The LCom signals transmitted by the luminaire are available to any computing device within range to receive it. Thus independent software may be developed that decodes the identifiers and develops a map of the indoor environment. This software would bypass any official or authorized applications that provide indoor navigation services in the indoor environment. In addition, the application developer and/or the owner of the indoor environment may not want unauthorized mapping of the indoor environment. For example, thieves may want to map out the details of a retail store in anticipation of a robbery.

Thus, and in accordance with an embodiment of the present disclosure, techniques and architecture are disclosed for a LCom system with rotating identifiers. The system includes a plurality of luminaires capable of transmitting LCom signals. Each luminaire transmits an identifier, but the identifier may change over time. This would make it difficult for unauthorized programs or persons to create a map of the indoor environment based on the transmitted identifiers because the mapping between identifiers and physical locations changes over time. Authorized navigation programs would receive up-to-date mapping information in order to provide accurate navigation services.

In some embodiments a central controller, such as a remote server, may controller rotation of identifiers. For example, a server may store a database of identifiers for each luminaire. For each luminaire, the server may assign an identifier from the database of identifiers and transmit that identifier to the luminaire. The luminaire then transmits the assigned identifier via an LCom signal. Upon certain triggering events, the server may rotate the identifier of each luminaire (e.g., select another identifier in the database of identifiers for each luminaire) and transmit the rotated identifier to each luminaire. The luminaire then transmits the new identifier via LCom signals. The server or a separate cloud server may also maintain mapping information associating the physical location of each luminaire with the identifier(s) used by that luminaire. When identifiers are rotated, the server may update the mapping information. A navigation application executing on a computing device in the indoor environment may receive and decode the LCom signals from the luminaires, and access the mapping information to determine the position of the computing device based on the received identifiers.

In other embodiments, there may not be a central controller. In such cases, each luminaire may store a database of identifiers. When the luminaires receive a trigger signal, each luminaire rotates its identifier. The navigation application on the computing device may store, or may have access to, mapping information that includes the physical location of each luminaire and the database of identifiers of each luminaire. Based on the combination of received identifier(s), the application may be able to determine the position of the computing device.

There are a number of different ways to trigger the rotation of identifiers. The identifier may be rotated at periodic time intervals or at specific times in the day. The luminaires may rotate identifiers based on the number of cycles of an alternating current (AC) power line that powers each luminaire. Identifier rotations may also be triggered via power reboots of the luminaires, changing of the supplied power in a particular pattern or sequence, changing the dimming level of the luminaires power in a particular pattern or sequence, upon detection of load shedding situations, or other detectable variations in operating parameters of the luminaires.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaires 100 that a given computing device 200 is currently present, as well as the position information for that particular computing device 200. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of mobile computing device position information or the position information of the luminaires 100. Numerous other such configurations will be apparent in light of this disclosure.

Figure 2B:
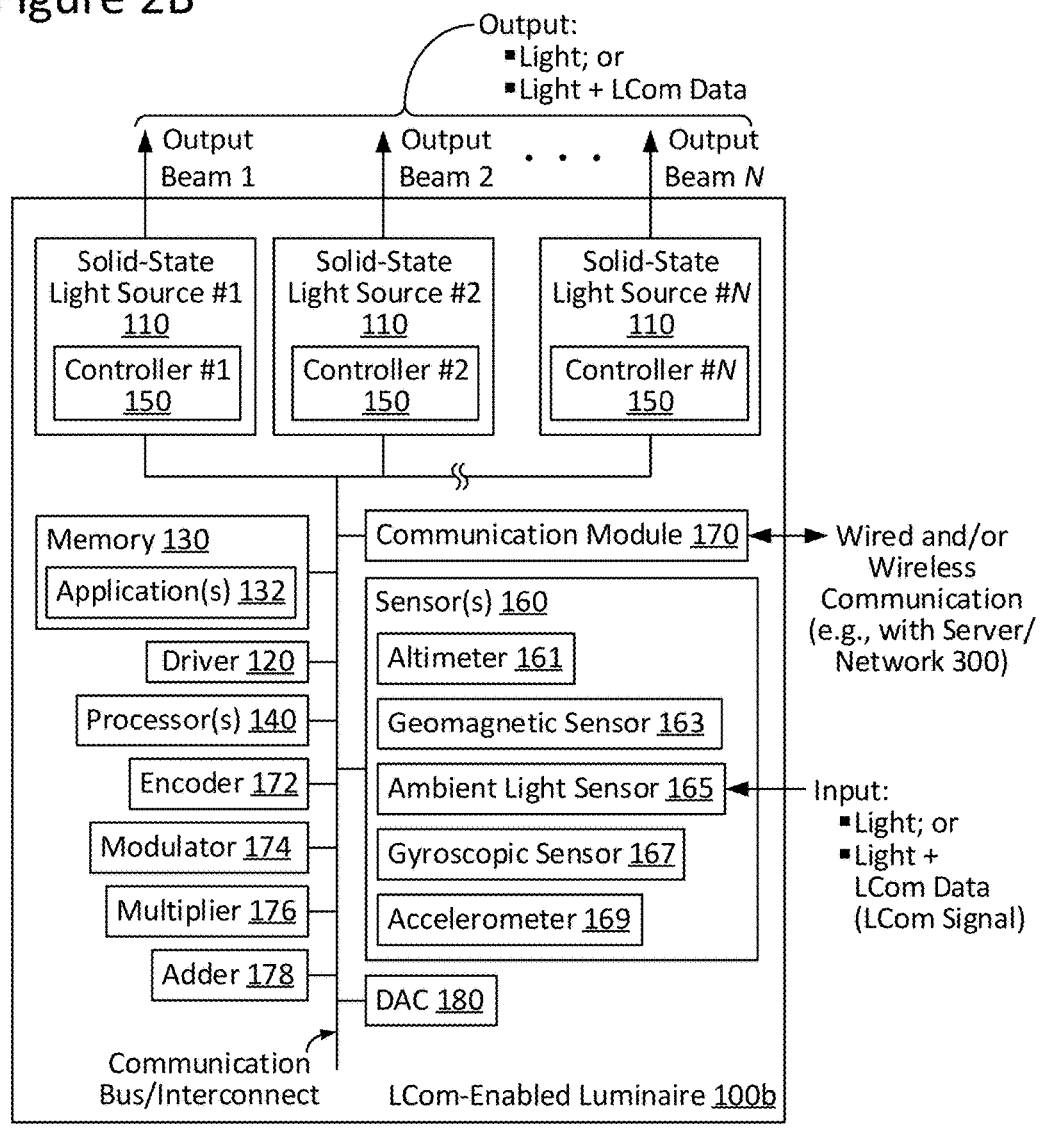
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s)

140 and memory 130 may be integrated within the controller 150. Numerous other configurations can be used.

With respect to FIGS. 2A-2B, a given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters) in order to transmit a LCom signal. To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 stores a database of identifiers that the luminaire 100 may transmit via LCom signals.

The one or more applications 132 stored in memory 130 can be accessed and executed, for example, by the one or more processors 140 of a given LCom-enabled luminaire 100. In accordance with some embodiments, a given application 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 132 can be instructions encoded on any suitable non-transitory machine-readable medium that, when executed by one or more processors 140, carries out functionality of a given LCom-enabled luminaire 100, in part or in whole.

In accordance with some embodiments, the one or more solid-state light sources 110 of a given LCom-enabled luminaire 100 can be electronically controlled, for example, to output light and light encoded with LCom data (e.g., an LCom signal). To that end, a given LCom-enabled luminaire 100 may include or otherwise be communicatively coupled with one or more controllers 150. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light in the form of LCom data, as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 100 may be controlled in such a manner as to output any number of output beams (1-N), which may include light in the form of LCom data, as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 to communicate luminaire position via an identifier. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of LCom signals for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing there through, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the estimated mobile computing device position information associated with the computing device 200 can be used by the luminaire to compute luminaire position. Whether the estimated mobile computing device position is computed in real time at the luminaire or received from somewhere else, the estimated mobile computing device position information can then be used to generate the LCom signals emitted by that luminaire 100 to communicate luminaire position to passing computing devices 200. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 170. Other suitable configurations for communication module 170 will depend on a given application and will be apparent in light of this disclosure.

Figure 3:
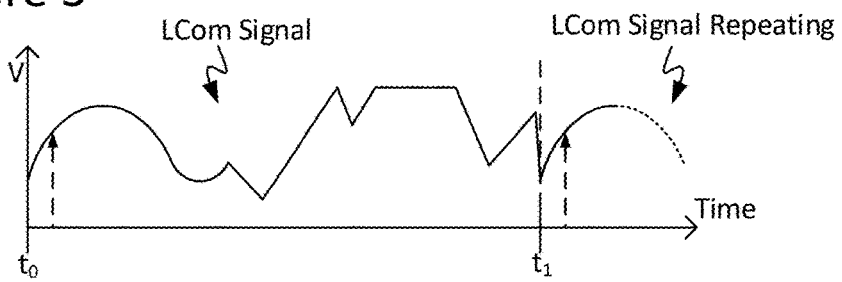
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal over a given time interval ($t_1$-$t_0$). In some cases, a given LCom-enabled luminaire 100 may be configured to repeatedly output its one or more LCom signals.

Figure 4:
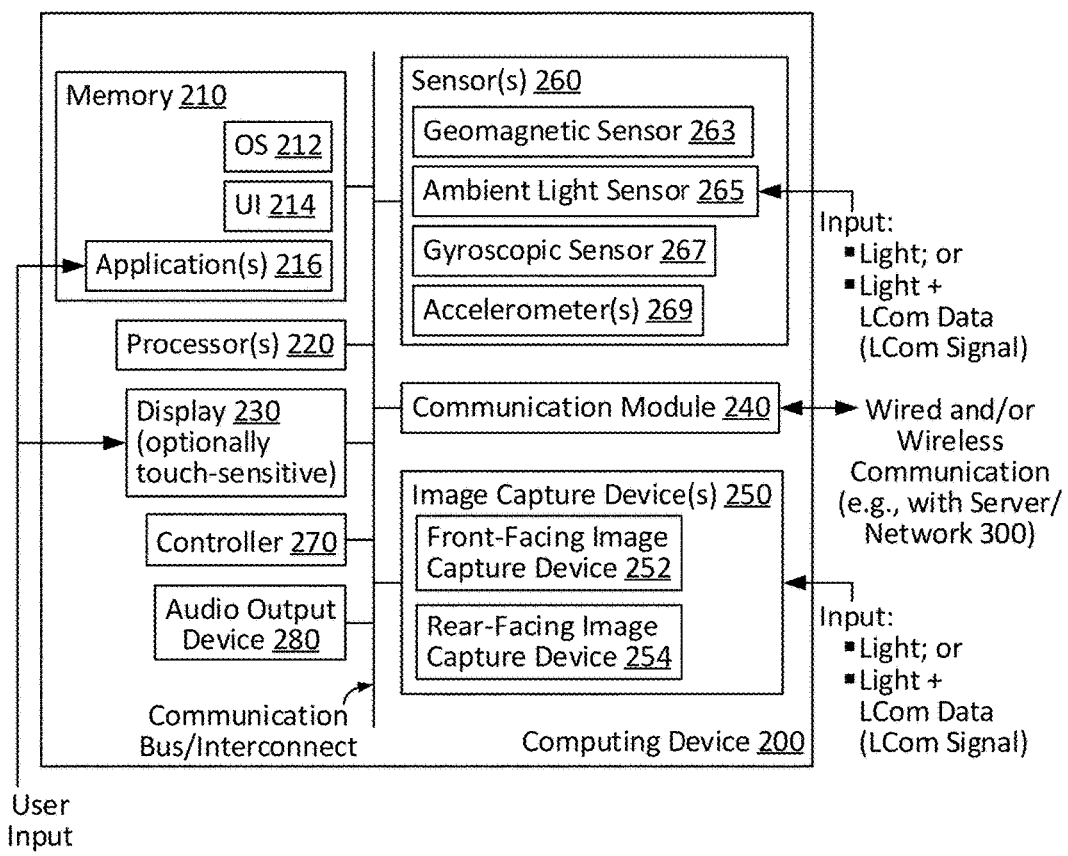
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal; (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Just as explained with respect to memory 130 of the luminaires 100, memory 210 of the device 200 may include information that can be used to compute or otherwise calculate an estimated mobile computing device location, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the computing device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some embodiments, a given application 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given computing device 200, in part or in whole. In one example embodiment, at least one of these applications 216 may be a navigation application configured to receive LCom signals, decode the LCom signals to extract information such as luminaire identifiers, and determine the position of the computing device 200 based on the luminaire identifiers and a map that associates luminaire identifiers with the physical locations of the luminaires. In addition, at least one application 216 may be further configured to also monitor the luminaire for any changes (orientation, with respect to computing device 200). Likewise, in some embodiments, the at least one application 216 may be further configured to optionally try to adjust its own settings to optimize decoding in effort to deal with situations where control by luminaire 100 is not available, for whatever reason.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given UI action. In some cases, a touch-sensitive display 230 may facilitate user interaction with computing device 200 via the UI 214 presented by such display 230. Numerous suitable configurations for display 230 will be apparent in light of this disclosure.

In accordance with some embodiments, computing device 200 may include a communication module 240, which may be a transceiver or other network interface circuit configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5)

a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. As a result of using these inertial sensors, the computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth-generation (G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 5:
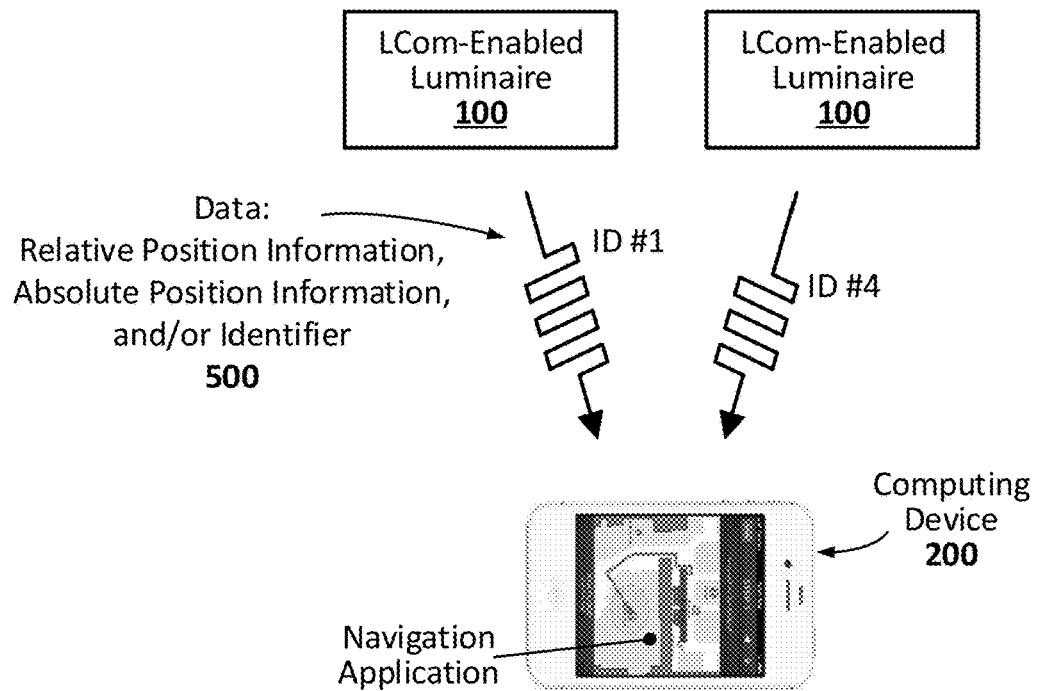
FIG. 5 illustrates an example LCom system, including an LCom-enabled luminaire and a computing device, in accordance with an embodiment of the present disclosure.

FIG. 5 illustrates an example LCom system, including an LCom-enabled luminaire and a computing device, in accordance with an embodiment of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map). In still other embodiments, the luminaire position may be communicated as an identifier, in which the transmitted ID translates to a specific location on a given map of the environment being navigated. In some such example cases, for instance, a luminaire might use dual tone multi frequency (DTMF) encoding, which means it continuously sends two unique frequencies. In some embodiments, the luminaire position may be communicated via a fiducial pattern as described herein.

Figure 6:
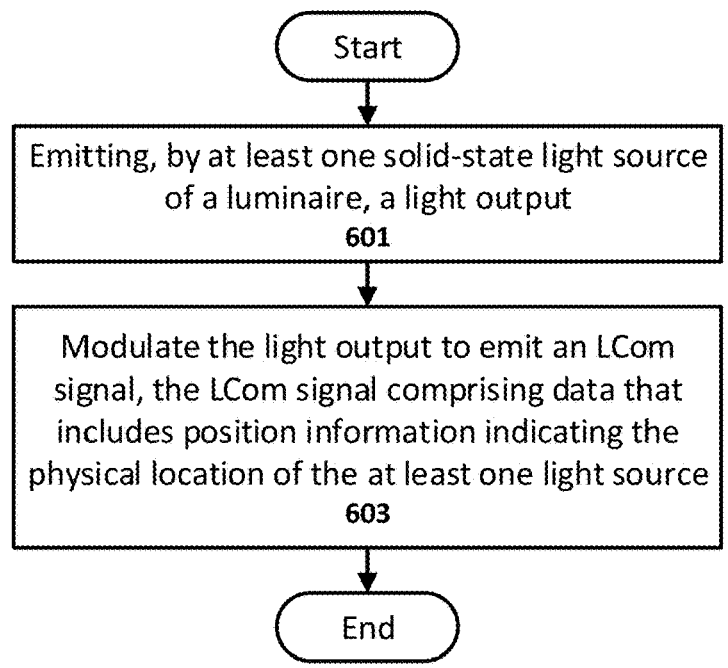
FIG. 6 illustrates an example method for emitting position information from an LCom-enabled luminaire, in accordance with an embodiment of the present disclosure.

FIG. 6 illustrates an example method for emitting position information from an LCom-enabled luminaire, in accordance with an embodiment of the present disclosure. As can be seen, the method includes emitting 601, by at least one solid-state light source of a luminaire, a light output. The method further includes modulating 603 the light output to emit an LCom signal, the LCom signal including data that includes position information indicating the physical location of the at least one light source. According to some embodiments, this position information may indicate that particular luminaire's location directly by virtue of relative or absolute position information, as previously explained. In other embodiments, this position information may indicate that particular luminaire's location indirectly by virtue of an identifier that translates to a specific location on a given map of the environment being navigated. Numerous other embodiments and variations using luminaires having known locations within a given area to be navigated will be apparent in light of this disclosure.

Rotating Identifiers with Central Control

Figure 7:
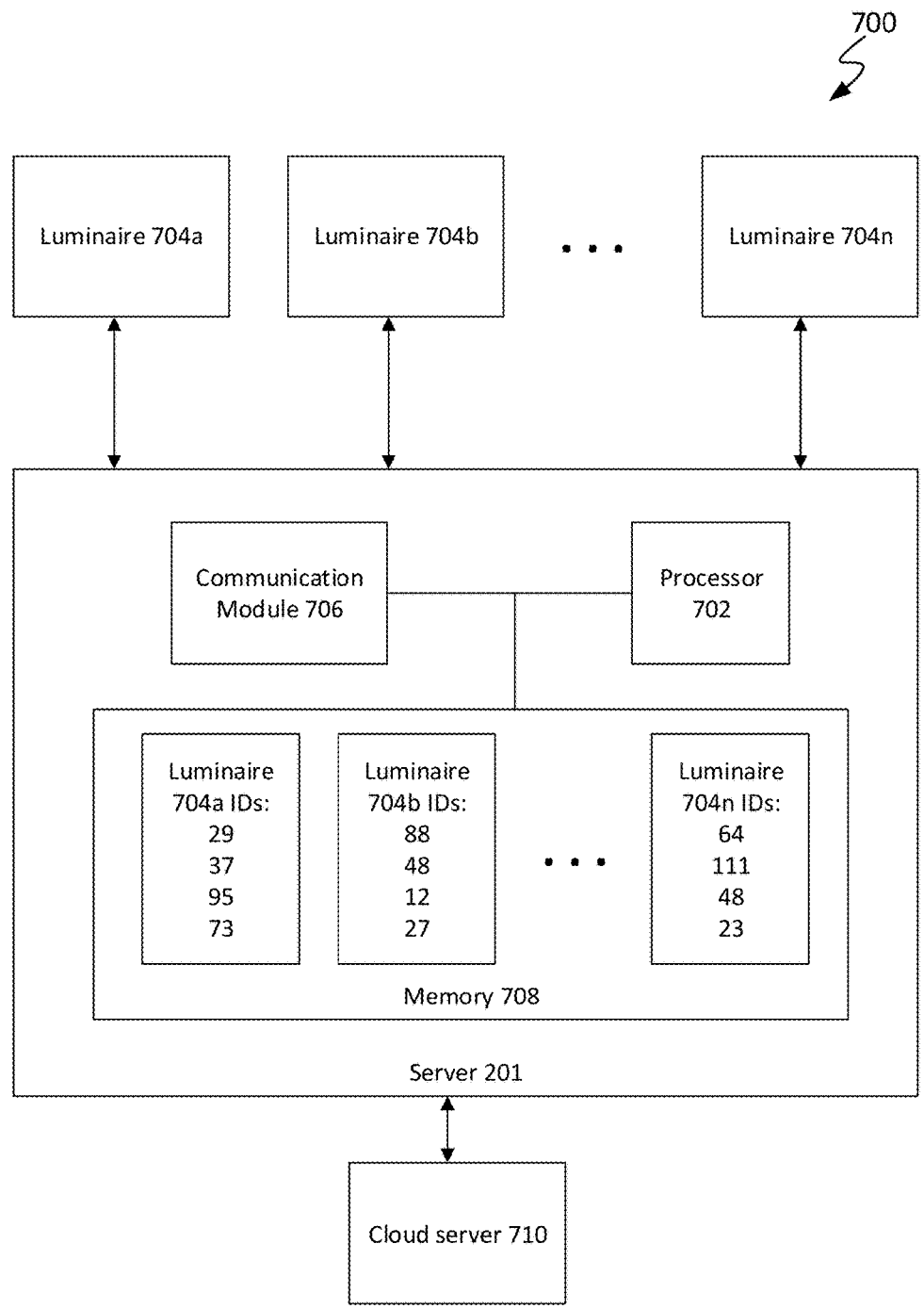
FIG. 7 is a block diagram illustrating an example LCom system including a remote server in accordance with an embodiment of the present disclosure.

FIG. 7 is a block diagram illustrating an example LCom system 700 including a remote server in accordance with an embodiment of the present disclosure. The system 700 includes a plurality of luminaires 704*a*-704*n*, collectively referred to as luminaires 704, in an indoor environment. Each luminaire 704 may be configured to transmit information via LCom signals, such as identifiers. A navigation application executing on a computing device may receive and decode the LCom signals to determine the position of the computing device. The system 700 also includes a server 201 communicatively coupled to the luminaires 704. The server 201 may include a processor 702, a memory 708, a communication module 706, and other components not illustrated in FIG. 7.

The communication module 706 may be used to communicate with the luminaires 704 through a network (e.g., the Internet, a local area network, a wide area network) via a variety of wired or wireless network connections such as Wi-Fi, Bluetooth, communication over AC lines, or power over Ethernet. The server 201 may communicate with the luminaires 704 using a variety of protocols, such as DALI which allows messages to be sent to individual or groups of luminaires. In some embodiments, the communication module 706 may also be used to communicate with a cloud server 710. The cloud server 710 may store mapping information that associates luminaire identifiers with the physical location of each luminaire. In some embodiments, the mapping information may include the current identifier used by each luminaire. In other embodiments, the mapping information may include the entire database of identifiers for each luminaire. In other embodiments, the mapping information is stored in the server 201 (i.e., the server 201 and the cloud server 710 are the same). The navigation application on the computing device may access the mapping information to determine its own position based on the received luminaire identifiers. For example, the navigation application may determine the physical location of the luminaires using the mapping information, and triangulate or otherwise logically deduce the position of the computing device from the location of the luminaires. In some embodiments, the navigation may locally store the mapping information and receives updates from the cloud server 710 (e.g., whenever the identifiers rotate). In other embodiments, the mapping information is not locally stored and the navigation application communicates with the cloud server 710 each time it is determining the location of the computing device.

The memory 708 may store, for each of the luminaires 704, a database of identifiers. The database of identifiers may store the possible identifiers that the luminaire may be assigned. For example, as shown in FIG. 7 luminaire 704*a* may be assigned identifiers 29, 37, 95, and 73, luminaire 704b may be assigned identifiers 88, 48, 12, and 27, and luminaire 704n may be assigned identifiers 64, 111, 48, and 23. The number of identifiers available to be assigned across all the luminaires 704 may depend on several factors, including the data rate at which a computing device may receive the LCom signal transmitted by the luminaires 704. For example, if a computing device utilizes standard complementary metal-oxide semiconductor (CMOS) cameras or light sensors, it may be able to receive up to two bytes of data in a single video frame. If the identifier is two bytes long and if one unique identifier is assigned to each luminaire, then the system 700 may support up to 65,536 different luminaires. However, if the database of identifiers for each luminaire 704 includes sixteen unique identifiers, a data rate of two bytes supports 4,096 unique luminaires.

In some embodiments, the luminaires 704 may transmit different types of identifiers. For example, some identifiers are general identifiers that represent a larger area such as a store. Other identifiers are specific identifiers that represent a smaller area in the larger area (e.g., specific aisles in the store). The database of identifiers may include both general and specific identifiers, and the luminaires 704 may rotate between general identifiers and specific identifiers. The ability to switch the specificity of the mapping may help in situations related to services, security, hardware capability, or environmental conditions. In some embodiments, each luminaire 704 may store the current identifier it is using.

In some embodiments, each identifier across all the databases of identifiers may be unique. In other embodiments, the same identifier may appear in more than one database of identifiers. In other words, different luminaires 704 may reuse some identifiers. For example, as illustrated in FIG. 7 both luminaire 704b and 704n may use identifier number 48. This increases the number of luminaires that may be supported given the reception data rate limit. However, this also means that more than one luminaire may be assigned to the same identifier at the same time. A conflict may arise if the luminaires that share the same identifier are close to each other. Conflicts may be resolved in a number of ways. For example, the navigation application may wait for the identifiers to rotate again until none of the luminaires in its proximate location share the same identifier. If the luminaires rotate between general and specific identifiers, the navigation application may use the general identifiers until the specific identifiers do not conflict. The navigation application may also use historical identifier and position information to resolve conflicts, and may also utilize information collected from other sensors or sources, such as GPS or accelerometers on the computing device.

The server 201 may initiate the rotation of identifiers for the luminaires 704 by sending a command to each luminaire 704. One example command sequence may be [unique static address of luminaire, new transmitted identifier of luminaire], but other command sequences may be used. The server 201 may rotate identifiers for the luminaires 704 in a number of different ways. For example, the rotation of identifiers may be done in a sequential or random nature. In sequential rotation, the server 201 may rotate the identifiers of the luminaire 704 sequentially through its respective database of identifiers (e.g., 29, 37, 95, 73, 29, etc. for luminaire 704a). In random rotation, the server 201 may randomly select the next identifier for luminaires 704 from their respective database of identifiers. Random rotation may be effective in preventing conflicts because sequential rotation causes conflicts to periodically occur. In some embodiments, the server 201 may employ rotation schemes that do not create conflicts. For example, for each rotation the server 201 may select three random luminaires far apart from each other to exchange identifiers to ensure that no luminaires that are close to each other share the same identifier.

The server 201 may also rotate identifiers through subsets of identifiers within the database of identifiers. For example, at the time of rotation the server 201 may create a subset of identifiers that includes the three last identifiers used and a randomly selected identifier from the remaining identifiers. The server 201 then randomly selects one of the identifiers in the subset as the next identifier for the luminaire. The selection may also be semi-random, for example weighted against the newly added identifier, in order to lengthen the amount of time it takes for the luminaire to use all the identifiers. In another example, the server 201 may create several subsets of identifiers (e.g., four subsets of four identifiers each), rotate quickly within each subset of identifiers, and switch to another subset over a longer period of time. In some embodiments, each luminaire may store a subset of identifiers and may quickly rotate between those identifiers when commanded by the server 201. The server 201 may update the stored subset of identifiers on the luminaires on a slower time scale. These methods may make it harder for an unauthorized program or person to collect all the identifiers used by each luminaire 704 because it takes a long time before the luminaire 704 cycles through all of its possible identifiers. In some embodiments, the server 201 may rotate the identifiers for the luminaires 704 at the same time. In other embodiments, the server 201 may rotate the identifiers for the luminaires 704 at different times.

The server 201 may initiate rotations in response to certain trigger signals. For example, trigger signals may be generated at periodic time intervals or at certain times of the day (e.g., every 4 hours, every 8 hours, every month, at 3 pm each day). Longer time intervals may be appropriate when rotating identifiers involves significant overhead or when the navigation application does not receive mapping information updates frequently.

Trigger signals may also be based on the number of cycles of an AC supply line that powers the luminaires 704. Each luminaire 704 may count the AC supply line cycles and rotate its identifiers independent of other luminaires or commands by the server 201. Alternatively, the server 201 may count the cycles of the AC supply line and initiate the rotations. For example, a trigger signal may be generated every 5,000 cycles of the AC supply line. In some embodiments, the number of cycles that trigger a rotation may vary in a repeating pattern. For example, trigger signals may be generated after 2,000 cycles, then 5,000 cycles, then 3,000 cycles, and then 4,000 cycles. This could be implemented as an offset table from a base cycle count (e.g., for a base cycle count of 5,000 cycles the offset table would include −3,000, 0, −2,000, and −1,000). The counts for each luminaire 704 may be reset by power reboots. Thus even if different luminaires 704 deviate in their cycle counts over time, a power reboot would resynchronize all the luminaires 704. The luminaires 704 may also be synchronized using sync pulses (e.g., half wave forms) transmitted through the AC supply line. The server 201 may be responsible for synchronizing the luminaires 704, for example by injecting the sync pulse into the AC supply or by initializing the power reboot. The navigation application may also receive the sync pulse so that it knows the identifiers have been rotated.

The trigger signal may also be based on one or more external triggers. One possible external trigger is a reboot of the power drivers for the luminaires. Every time the power driver of the luminaires turns on or off, the identifiers may rotate. For example, when a person turns on the luminaires in a store for the first time in the morning, the luminaire identifiers may rotate. In this case, each luminaire may have memory to store the last used identifier. In another example, the luminaires may rotate identifiers during short power cycles and resynchronize after long power down cycles (i.e., reset the identifiers to the first identifier in the database of identifiers for each luminaire). If the luminaires share identifiers, then resynchronization may reduce the chance that no luminaires use the same identifier at the same time. The short power cycles may be long enough to detect but short enough to retain information in memory.

Another external trigger may be a pattern of short power cycles. For example, the server 201 or the luminaires 704 may detect five pulses spaced by 100 milliseconds (ms), and in response rotate the identifiers. This may avoid triggering rotations when there are short power outages. The server 201 may be configured to generate the pattern of short power cycles to trigger the rotation, or a user may manually turn the power on and off. Another external trigger may be certain load shedding situations. The server 201 or each luminaire 704 may be configured to detect the load shedding level and rotate the identifiers in response.

Another external trigger may be a change in dimming level. Small changes in dimming level (e.g., from 99% to 98% of full brightness) may not be detectable by a person but may represent a trigger signal to rotate identifiers. The server 201 may use dimming commands to trigger a rotation. In some embodiments, the database of identifiers may be indexed by specific dimming levels. For example, a database of four identifiers may be associated with dimming levels of 96%, 97%, 98%, and 99%. If the identifiers become compromised, the server 201 may bypass the compromised set by not using those specific dimming levels. In order to not interfere with normal dimming operations, certain dimming levels may be reserved for rotation commands or identifier indexes or a pattern of dimming levels may be used to trigger a rotation. For example, a pattern in which the dimming level switches between 95% and 98% five times every 100 ms may represent a first identifier, and a pattern in which the dimming level switches between 95% and 98% five times every 150 ms may represent a second identifier.

The dimming level may also be controlled by a daylight harvesting program which changes the light level based on ambient light coming into the indoor environment through windows. The identifiers may be rotated when the light harvesting program sets the dimming level to certain values.

When the luminaire identifiers rotate, the server 201 may transmit the new identifiers to the cloud server 710 and the cloud server 710 updates the mapping information to reflect the new identifiers. In some embodiments, to shorten the update time the map may relate multiple identifiers to the same location. For example, the server 201 may associate the multiple identifiers with an index, and transmit the index to the cloud server 710 rather than the individual identifiers. The cloud server 710 may also store the associations between indexes and identifiers. In some embodiments, a Bluetooth® beacon could serve as an intermediate node between the server 201 and the cloud server 710. The Bluetooth® beacon may be configured to transmit the indexes in short, quick data packets. In some embodiments, the cloud server 710 may use an offset count than is known by both the server 201 and the cloud server 701. All the identifiers may be offset by a certain number (e.g., 20) before transmission and transmitted to the cloud server 701. The cloud server 710 may reverse the offset to obtain the true identifiers. This could also be used in conjunction with an index. Each index may be associated with a different offset. The server 201 may transmit the index number, and the cloud server may select the identifiers corresponding to the index and apply the associated offset to the identifiers.

The navigation application on the computing device may access the cloud server 710 to determine its position based on the received luminaire identifiers. In embodiments without the cloud server 710, the server 201 may directly maintain the mapping information. The navigation application may access the cloud server 710 (or server 201) to obtain updated mapping information. In some embodiments, the navigation application may obtain updated mapping information at certain hotspots in the indoor environment, such as the entrance. A Wi-Fi signal or beacon signal at the hotspot may instruct the navigation application to update the mapping information to account for rotated identifiers.

In some embodiments, the server 201 may not always be connected to the cloud server 710. During an initial commissioning process, the cloud server 710 may provide luminaire identifiers to the server 201 (e.g., a database of identifiers for each luminaire). The server 201 may assign the identifiers to the luminaires 710 and rotate them without being connected to the cloud server 710. At some later time, the server 201 may reconnect with the cloud server 710 and be recommissioned (i.e., receive a new pool of identifiers). The navigation application on the computing device may also be used to communicate information to the server 201 when the server 201 is not connected to the cloud server 710. For example, the navigation application may receive a message from the cloud server 710 or another source to rotate the identifiers (for example, in response to detecting a security breach). The navigation application may forward the message to the server 201 via Bluetooth® or another communication medium.

Figure 8:
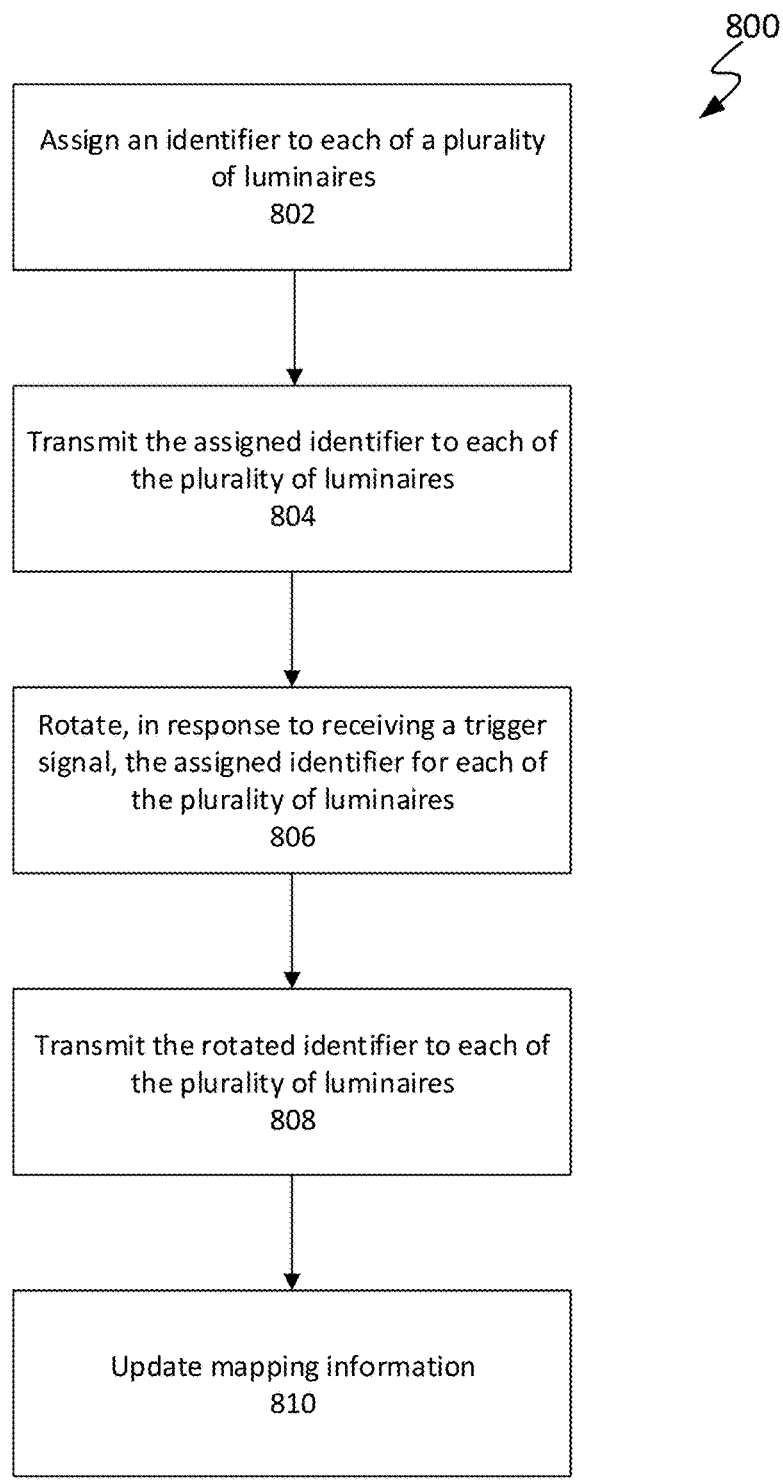
FIG. 8 illustrates a method of providing identifiers in a light-based communication system in accordance with an embodiment of the present disclosure.

FIG. 8 illustrates a method 800 of providing identifiers in a light-based communication system in accordance with an embodiment of the present disclosure. The method 800 may be performed by a server (e.g., server 201) communicatively coupled to a plurality of luminaires. The plurality of luminaires may be configured to transmit information (e.g., identifiers) via LCom signals. The plurality of luminaires may be located in an indoor environment, such as a retail store.

In block 802, the server may assign an identifier to each of the plurality of luminaires. The server may store a database of identifiers for each luminaire, and select the identifier from the database of identifiers. The luminaires may each be associated with one or more unique identifiers, or some identifiers may be shared between multiple luminaires. The selection may be sequential, random, semi-random, or some other method. The server may update mapping information that associates the physical locations of each luminaire with the assigned identifier. The mapping information may be stored at the server, or at a separate cloud server communicatively coupled to the server.

In block 804, the server may transmit the assigned identifier to each of the plurality of luminaires. For example, the server may transmit a DALI command to each luminaire that include the assigned identifier. Each of the plurality of luminaires may transmit the assigned identifier via LCom signals. A computing device may receive the LCom signals from one or more luminaires and access the mapping information on the server or separate cloud server to determine the location of the computing device. For example, the computing device may execute a navigation application that decodes the LCom signals to obtain the identifiers for luminaires proximate to the computing device and accesses the mapping information to provide location and navigation services.

In block 806, the server may rotate the assigned identifier for each of the plurality of luminaires in response to receiving a trigger signal. The trigger signal may be based on a number of sources. For example, the server may generate the trigger signal at periodic time intervals, or after a certain number of cycles of an AC power supply line powering the luminaires. The trigger signal may also be based on at least one of a reboot of the plurality of luminaires, a power cycle pattern applied to the plurality of luminaires, a change in dimming level of the plurality of luminaires, and a change in load shedding level of the plurality of luminaires.

The server may rotate the identifier of each luminaire to another identifier in the database of identifiers associated with that luminaire. There are various rotation methods that could be used. For example, the server may rotate the identifiers sequentially or at random. In another example, the server may create one or more subsets of identifiers within the database of identifiers, and select another identifier from the subset. In some embodiments, the server may implement a rotation method that reduces or eliminates the chance of a conflict in which multiple luminaires close to each other are assigned the same identifier at the same time. In some embodiments, the server may implement a rotation method that ensures there is a long period of time before the luminaire cycles through all of its possible identifiers (e.g., rotate within subsets of identifiers quickly and rotate between subsets slowly). In some embodiments, the server may rotate the identifiers for the plurality of luminaires at the same time. In other embodiments, the server may rotate the identifiers for the plurality of luminaires at different times.

In block 808, the server may transmit the rotated identifier to each of the plurality of luminaires. Each of the plurality of luminaires may transmit the rotated identifier via LCom signals. In block 810, the server may update mapping information that associates the physical locations of each luminaire with the assigned identifier. For example, the server may transmit the new identifiers for each luminaire to the cloud server where the mapping information is stored. A navigation application on the computing device would access up-to-date mapping information from the cloud server. In this manner, the method 800 provides a way to rotate identifiers in a LCom-based navigation system to thwart unauthorized attempts to collect identifier and position information.

Rotating Identifiers without Central Control

Figure 9:
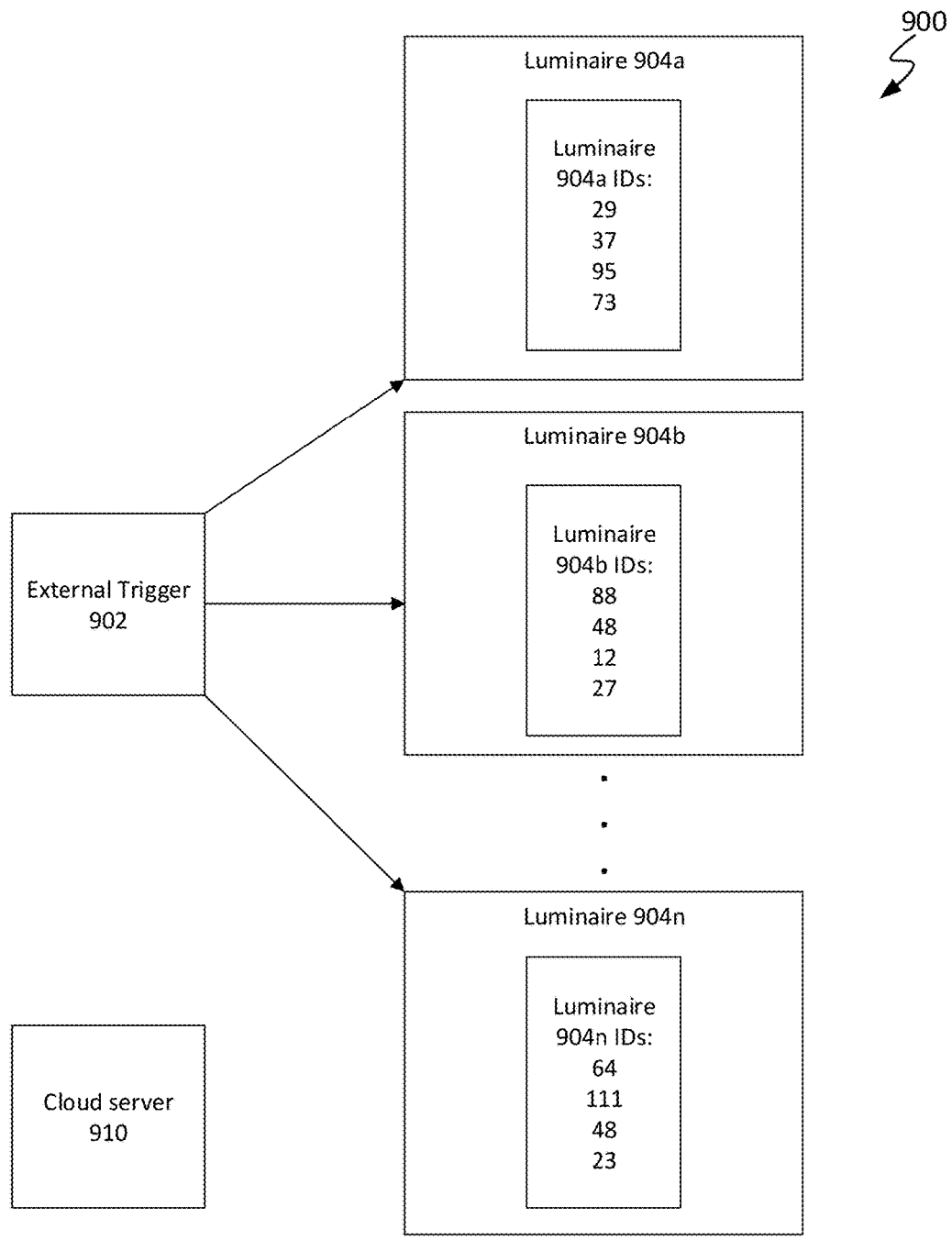
FIG. 9 is a block diagram illustrating an example light-based communication (LCom) system without a remote server in accordance with an embodiment of the present disclosure.

FIG. 9 is a block diagram illustrating an example LCom system 900 in accordance with an embodiment of the present disclosure. The system 900 includes a plurality of luminaires 904a-904n, collectively referred to as luminaires 904, in an indoor environment. Each luminaire 904 may be configured to transmit information via LCom signals, such as identifiers. A navigation application executing on a computing device may receive and decode the LCom signals. The navigation application may access cloud server 910, which stores mapping information associating the physical location of the luminaires 704 with their respective identifiers. In some embodiments, the mapping information may include the entire database of identifiers for each luminaire. The navigation may determine the physical location of luminaires that it has received identifiers from, and determine the position of the computing device. Unlike the system 700 illustrated in FIG. 7, the system 900 does not include a remote server. Thus there is no central control for identifier rotation, but rather each luminaire 904 is configured to independently rotate identifiers.

Each luminaire 904 may include a controller and memory that stores a database of identifiers for that respective luminaire. The database of identifiers may store the possible identifiers that the luminaire may be assigned. For example, as shown in FIG. 9 luminaire 904a may be assigned identifiers 29, 37, 95, and 73, luminaire 904b may be assigned identifiers 88, 48, 12, and 27, and luminaire 904n may be assigned identifiers 64, 111, 48, and 23. The number of identifiers available to be assigned across all the luminaires 904 may depend on several factors, including the data rate at which a computing device may receive the LCom signal transmitted by the luminaires 904. For example, if a computing device utilizes standard complementary metal-oxide semiconductor (CMOS) cameras or light sensors, it may be able to receive up to two bytes of data in a single video frame. If the identifier is two bytes long and if one unique identifier is assigned to each luminaire, then the system 900 may support up to 65,536 different luminaires. However, if the database of identifiers for each luminaire 904 includes sixteen unique identifiers, a data rate of two bytes supports 4,096 unique luminaires.

In some embodiments, the luminaires 904 may transmit different types of identifiers. For example, some identifiers are general identifiers that represent a larger area such as a store. Other identifiers are specific identifiers that represent a smaller area in the larger area (e.g., specific aisles in the store). The database of identifiers may include both general and specific identifiers, and the luminaires 904 may rotate between general identifiers and specific identifiers. The ability to switch the specificity of the mapping may help in situations related to services, security, hardware capability, or environmental conditions.

In some embodiments, each identifier across all the databases of identifiers may be unique. In other embodiments, the same identifier may appear in more than one database of identifiers. In other words, different luminaires 904 may reuse some identifiers. For example, as illustrated in FIG. 9 both luminaire 904b and 904n may use identifier number 48. This increases the number of luminaires that may be supported given the reception data rate limit. However, this also means that more than one luminaire may be assigned to the same identifier at the same time. A conflict may arise if the luminaires that share the same identifier are close to each other Conflicts may be resolved in a number of ways. For example, the navigation application may wait for the identifiers to rotate again until none of the luminaires in its proximate location share the same identifier. If the luminaires rotate between general and specific identifiers, the navigation application may use the general identifiers until the specific identifiers do not conflict. The navigation application may also use historical identifier and position information to resolve conflicts, and may also utilize information collected from other sensors or sources, such as GPS or accelerometers on the computing device.

Each luminaire 904 may rotate identifiers in a number of different ways. For example, the rotation of identifiers may be done in a sequential or random nature. In sequential rotation, each luminaire 904 may sequentially rotate through its respective database of identifiers (e.g., 29, 37, 95, 73, 29, etc. for luminaire 904a). In random rotation, each luminaire 904 may randomly select the next identifier from the database of identifiers. Random rotation may be effective in preventing conflicts because sequential rotation causes conflicts to periodically occur. In some embodiments, the luminaires 904 may employ rotation schemes that do not create conflicts. For example, no identifiers may be shared between luminaires, or shared identifiers may be staggered in time so that no luminaires use the same identifier at the same time.

The luminaires may also rotate identifiers through subsets of identifiers within the database of identifiers. For example, at the time of rotation each luminaire may create a subset of identifiers that includes the three last identifiers used and a randomly selected identifier from the remaining identifiers. The luminaire then randomly selects one of the identifiers in the subset as the next identifier for the luminaire. The selection may also be semi-random, for example weighted against the newly added identifier, in order to lengthen the amount of time it takes for the luminaire to use all the identifiers. In another example, the luminaire 904 may create several subsets of identifiers (e.g., four subsets of four identifiers each), rotate quickly within each subset of identifiers, and switch to another subset over a longer period of time. These methods may make it harder for an unauthorized program or person to collect all the identifiers used by each luminaire 904 because it takes a long time before the luminaires cycle through all of its possible identifiers.

The luminaires 904 may initiate rotations in response to certain trigger signals. The trigger signals may be generated by or based on an external trigger 902 such that the luminaires 904 remain synchronized. For example, the external trigger 902 may be a clock and trigger signals may be generated at periodic time intervals or at certain times of the day (e.g., every 4 hours, every 8 hours, every month, at 3 pm each day). Longer time intervals may be appropriate when rotating identifiers involves significant overhead or when the navigation application does not receive mapping information updates frequently.

In some embodiments, the external trigger 902 may be an AC power supply that powers the luminaires 904 and the trigger signals may also be based on the number of cycles of the AC supply line. Each luminaire 904 may count the AC supply line cycles and rotate its identifiers after reaching a certain number of cycles. For example, a trigger signal may be generated every 5,000 cycles of the AC supply line. In some embodiments, the number of cycles that trigger a rotation may vary in a repeating pattern. For example, trigger signals may be generated after 2,000 cycles, then 5,000 cycles, then 3,000 cycles, and then 4,000 cycles. This could be implemented as an offset table from a base cycle count (e.g., for a base cycle count of 5,000 cycles the offset table would include −3,000, 0, −2,000, and −1,000). The counts for each luminaire 904 may be reset by power reboots. Thus even if different luminaires 904 deviate in their cycle counts over time, a power reboot would resynchronize all the luminaires 904. The luminaires 904 may also be synchronized using sync pulses (e.g., half wave forms) transmitted through the AC supply line (by, for example, the cloud server 910). The navigation application may also receive the sync pulse so that it knows the identifiers have been rotated.

In some embodiments, a trigger signal may also be based on a reboot of the power drivers for the luminaires. Every time the power driver of the luminaires turns on or off, the identifiers may rotate. For example, when a person turns on the luminaires in a store for the first time in the morning, the luminaire identifiers may rotate. In another example, the luminaires may rotate identifiers during short power cycles and resynchronize after long power down cycles (i.e., reset the identifiers to the first identifier in the database of identifiers for each luminaire). If the luminaires share identifiers, then resynchronization may reduce the chance that no luminaires use the same identifier at the same time. The short power cycles may be long enough to detect but short enough to retain information in memory.

Another external trigger may be a pattern of short power cycles. For example, the luminaires 904 may detect five pulses spaced by 100 milliseconds (ms) from the AC power supply, and in response rotate the identifiers. This may avoid triggering rotations when there are short power outages. The cloud server 910 may be configured to generate the pattern of short power cycles to trigger the rotation, or a user may manually turn the power on and off. Another external trigger may be certain load shedding situations. Each luminaire 904 may be configured to detect the load shedding level and rotate the identifiers in response.

Another external trigger may be a change in dimming level. Small changes in dimming level (e.g., from 99% to 98% of full brightness) may not be detectable by a person but may represent a trigger signal to rotate identifiers. When the luminaires 904 detect a change in dimming level to a specific dimming level, the luminaires 904 may rotate identifiers. In some embodiments, the database of identifiers may be indexed by specific dimming levels. For example, a database of four identifiers may be associated with dimming levels of 96%, 97%, 98%, and 99%. In order to not interfere with normal dimming operations, certain dimming levels may be reserved for rotation commands or identifier indexes or a pattern of dimming levels may be used to trigger a rotation. For example, a pattern in which the dimming level switches between 95% and 98% five times every 100 ms may represent a first identifier, and a pattern in which the dimming level switches between 95% and 98% five times every 150 ms may represent a second identifier.

The dimming level may also be controlled by a daylight harvesting program which changes the light level based on ambient light coming into the indoor environment through windows. The identifiers may be rotated when the light harvesting program sets the dimming level to certain values.

In some embodiments, when the luminaire identifiers rotate the luminaires 904 may transmit the new identifiers to the cloud server 910 and the cloud server 910 updates the mapping information to reflect the new identifiers. In other embodiments, the cloud server 910 stores the database of identifiers for each luminaire 904 so there is no need to update the cloud server 910 after every rotation. The navigation application on the computing device may access the cloud server 910 to determine its position based on the received luminaire identifiers. The navigation application may access the cloud server 910 to obtain updated mapping information. In some embodiments, the navigation application may obtain updated mapping information at certain hotspots in the indoor environment, such as the entrance. A Wi-Fi signal or beacon signal at the hotspot may instruct the navigation application to update the mapping information to account for rotated identifiers.

Figure 10:
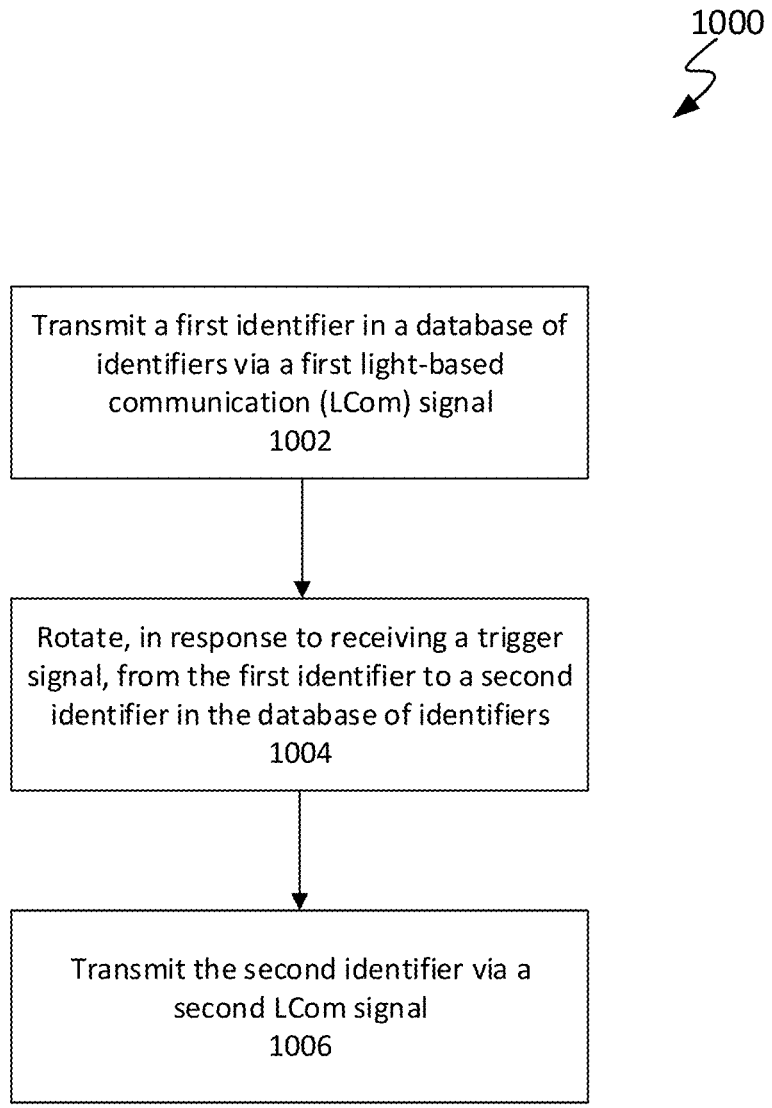
FIG. 10 illustrates a method of providing identifiers in a light-based communication system in accordance with an embodiment of the present disclosure.

FIG. 10 illustrates a method 1000 of providing identifiers in a light-based communication system in accordance with an embodiment of the present disclosure. The method 1000 may be performed by one or more of a plurality of luminaires (e.g., luminaires 904). The plurality of luminaires may be configured to transmit information (e.g., identifiers) via LCom signals. The plurality of luminaires may be located in an indoor environment, such as a retail store.

In block 1002, the luminaire may transmit a first identifier in a database of identifiers via a first LCom signal. The luminaire may store a database of identifiers that it may use, and select the first identifier from the database of identifiers. The luminaires may each be associated with one or more unique identifiers, or some identifiers may be shared between multiple luminaires. A cloud server may store mapping information associating physical locations of luminaires with their possible identifiers. A computing device may receive the LCom signals from one or more luminaires and access the mapping information on the cloud server to determine the location of the computing device. For example, the computing device may execute a navigation application that decodes the LCom signals to obtain the identifiers for luminaires proximate to the computing device and accesses the mapping information to provide location and navigation services.

In block 1004, the luminaire may rotate from the first identifier to a second identifier in response to receiving a trigger signal. The trigger signal may be based on a number of sources. For example, the trigger signal may be generated at periodic time intervals, or after a certain number of cycles of an AC power supply line powering the luminaire. The trigger signal may also be based on at least one of a reboot of the plurality of luminaires, a power cycle pattern applied to the plurality of luminaires, a change in dimming level of the plurality of luminaires, and a change in load shedding level of the plurality of luminaires.

There are various rotation methods that the luminaire may use. For example, the luminaire may rotate the identifiers sequentially or at random. In another example, the luminaire may create one or more subsets of identifiers within the database of identifiers, and select another identifier from the subset. In some embodiments, the luminaire may implement a rotation method that reduces or eliminates the chance of a conflict in which multiple luminaires close to each other are assigned the same identifier at the same time. In some embodiments, the luminaire may implement a rotation method that ensures there is a long period of time before the luminaire cycles through all of its possible identifiers (e.g., rotate within subsets of identifiers quickly and rotate between subsets slowly).

In block 1006, the luminaire may transmit the second identifier via a second LCom signal. In some embodiments, luminaire may transmit the rotated identifiers to the cloud server so that the cloud server may update the mapping information. In this manner, the method 1000 provides a way to rotate identifiers in a LCom-based navigation system to thwart unauthorized attempts to collect identifier and position information.

Further Considerations

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A light-based communication system, comprising:
a plurality of luminaires, wherein each of the plurality of luminaires is configured to transmit light-based communication (LCom) signals; and
a server communicatively coupled to the plurality of luminaires and configured to:
assign an identifier to each of the plurality of luminaires;
transmit the assigned identifier to each of the plurality of luminaires, wherein each of the plurality of luminaires transmits the assigned identifier via LCom signals;
rotate, in response to receiving a trigger signal, the assigned identifier for each of the plurality of luminaires; and
transmit the rotated identifier to each of the plurality of luminaires, wherein each of the plurality of luminaires transmits the rotated identifier via LCom signals.

2. The system of claim 1, wherein the server is further configured to:
update mapping information that associates the physical location of each of the plurality of luminaires with the assigned identifier of the luminaire.

3. The system of claim 2, wherein the mapping information is stored on a cloud server communicatively coupled to the server.

4. The system of claim 2, wherein a computing device receives the LCom signals and accesses the mapping information to determine the position of the computing device.

5. The system of claim 1, wherein:
the server associates a database of identifiers with each of the plurality of luminaires; and
the assigned identifier and the rotated identifier for each luminaire is selected from the database of identifiers associated with the luminaire.

6. The system of claim 1, wherein the server is configured to rotate the assigned identifier for each of the plurality of luminaires by:
generating, for each of the plurality of luminaires, a subset of identifiers from a database of identifiers; and
selecting the rotated identifier from the subset of identifiers.

7. The system of claim 1, wherein the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

8. A method of providing identifiers in a light-based communication system, comprising:
assigning, by a server, an identifier to each of a plurality of luminaires;
transmitting the assigned identifier to each of the plurality of luminaires, wherein each of the plurality of luminaires transmits the assigned identifier via light-based communication (LCom) signals;
rotating, by the server in response to receiving a trigger signal, the assigned identifier for each of the plurality of luminaires; and
transmitting the rotated identifier to each of the plurality of luminaires, wherein each of the plurality of luminaires transmits the rotated identifier via LCom signals.

9. The method of claim 8, the method further comprising updating mapping information that associates the physical location of each of the plurality of luminaires with the assigned identifier of the luminaire.

10. The method of claim 9, wherein the mapping information is stored on a cloud server communicatively coupled to the server.

11. The method of claim 9, wherein a computing device receives the LCom signals and accesses the mapping information to determine the position of the computing device.

12. The method of claim 8, the method further comprising:
associating, by the server, a database of identifiers with each of the plurality of luminaires, wherein the assigned identifier and the rotated identifier for each luminaire is selected from the database of identifiers associated with the luminaire.

13. The method of claim 8, wherein rotating the assigned identifier for each of the plurality of luminaires comprises:
    generating, for each of the plurality of luminaires, a subset of identifiers from a database of identifiers; and
    selecting the rotated identifier from the subset of identifiers.

14. The method of claim 8, wherein the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

15. A light-based communication system, comprising:
    a plurality of luminaires, wherein a first luminaire in the plurality of luminaires stores a first database of identifiers and is configured to:
        transmit a first identifier in the first database of identifiers via a first light-based communication (LCom) signal;
        rotate, in response to receiving a first trigger signal, from the first identifier to a second identifier in the first database of identifiers; and
        transmit the second identifier via a second LCom signal.

16. The system of claim 15, wherein a second luminaire in the plurality of luminaires stores a second database of identifiers and is configured to:
    transmit a third identifier in the second database of identifiers via a third LCom signal;
    rotate, in response to receiving a second trigger signal, from the third identifier to a fourth identifier in the second database of identifiers; and
    transmit the fourth identifier via a fourth LCom signal.

17. The system of claim 16, wherein the first database of identifiers and the second database of identifiers includes at least one common identifier.

18. The system of claim 16, wherein the first trigger signal and the second trigger signal are received at the same time.

19. The system of claim 15, wherein rotating from the first identifier to the second identifier comprises:
    generating a subset of identifiers from the first database of identifiers, the subset of identifiers including the second identifier; and
    selecting the second identifier from the subset of identifiers.

20. The system of claim 19, wherein the subset of identifiers includes the first identifier.

21. The system of claim 15, wherein each of the plurality of luminaires is configured to rotate identifiers in response to receiving the first trigger signal.

22. The system of claim 15, wherein the first trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

23. The system of claim 15, wherein a mobile computing device receives the first LCom signal and the second LCom signal and accesses mapping information to determine the position of the computing device.

24. A method of providing identifiers in a light-based communication system, comprising:
    transmitting, by a first luminaire in a plurality of luminaires, a first identifier in a database of identifiers via a first light-based communication (LCom) signal, wherein the database of identifiers is stored in the first luminaire;
    rotating, by the first luminaire in response to receiving a trigger signal, from the first identifier to a second identifier in the database of identifiers; and
    transmitting, by the first luminaire, the second identifier via a second LCom signal.

25. The method of claim 24, wherein rotating from the first identifier to the second identifier comprises:
    generating a subset of identifiers from the database of identifiers, the subset of identifiers including the second identifier; and
    selecting the second identifier from the subset of identifiers.

26. The method of claim 25, wherein the subset of identifiers includes the first identifier.

27. The method of claim 24, wherein each of the plurality of luminaires is configured to rotate identifiers in response to receiving the trigger signal.

28. The method of claim 24, wherein the trigger signal is based on at least one of periodic time intervals, an alternating current power supply that powers the plurality of luminaires, a reboot of the plurality of luminaires, a power cycle pattern applied to the plurality of luminaires, a change in dimming level of the plurality of luminaires, and a change in load shedding level of the plurality of luminaires.

29. The method of claim 24, wherein a mobile computing device receives the first LCom signal and the second LCom signal and accesses mapping information to determine the position of the computing device.

* * * * *